April 19, 1949.  J. N. GLADDEN  2,467,887
HYDRAULIC CONTROL SYSTEM
Filed July 25, 1942
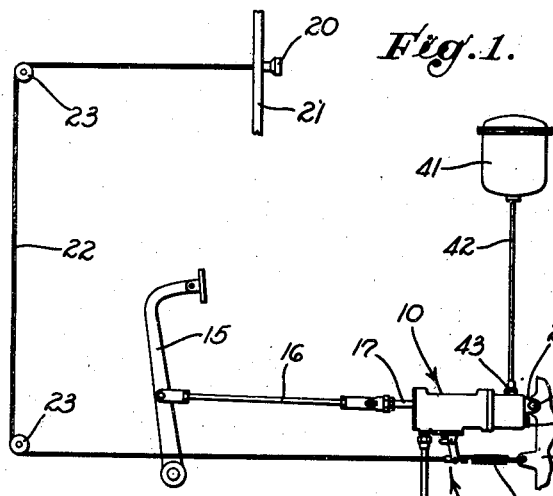
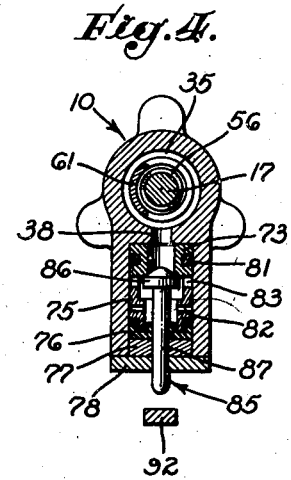
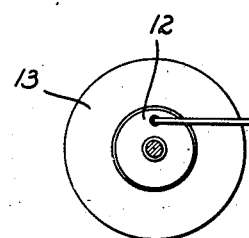
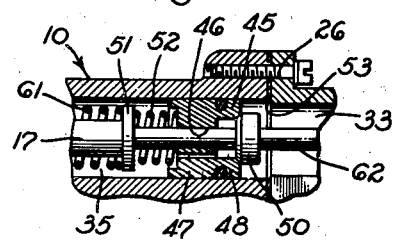
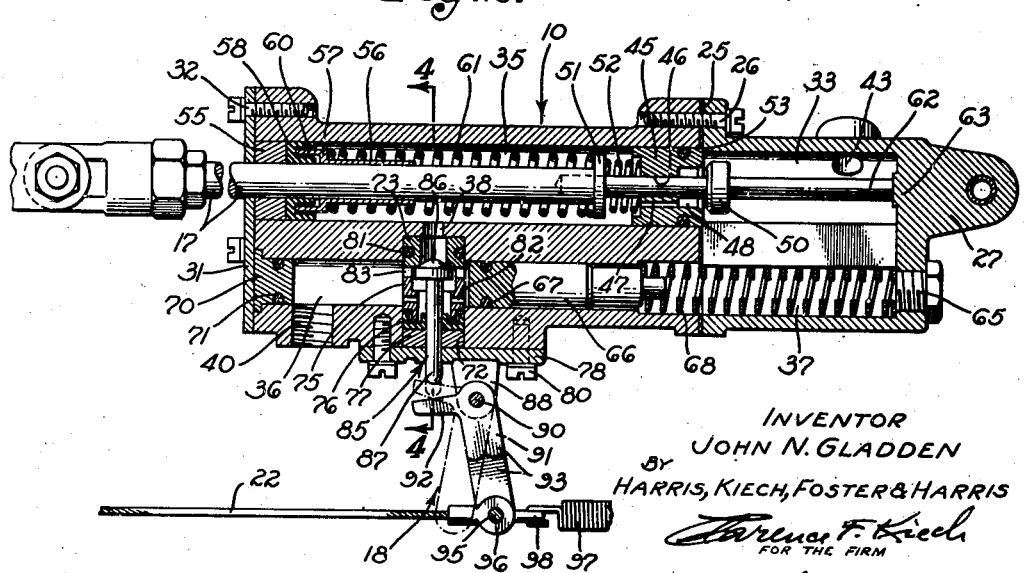
INVENTOR
JOHN N. GLADDEN
BY HARRIS, KIECH, FOSTER & HARRIS
*Lawrence F. Kiech*
FOR THE FIRM
ATTORNEYS.

Patented Apr. 19, 1949

2,467,887

UNITED STATES PATENT OFFICE 2,467,887

HYDRAULIC CONTROL SYSTEM

John N. Gladden, Glendale, Calif.

Application July 25, 1942, Serial No. 452,335

10 Claims. (Cl. 60—54.5)

My invention relates to fluid-pressure systems for controlling and actuating various devices. While the invention may be used for various purposes in various fields, it is especially applicable to the control of devices on vehicles or aircraft by means of a fluid medium. By way of illustration, the invention will be described herein as embodied in a hydraulic brake system.

In a brake system of the general type under consideration, a power chamber is connected by a suitable passage extending through a conduit to individual braking mechanisms, suitable means, such as a pedal-controlled piston in the power chamber, being employed to create pressure in the chamber. To keep the brakes continuously applied for parking, some provision is made for locking or latching the system with the brakes applied. In one type of brake system heretofore prevalent, such parking means comprises a latch to immobilize the pressure-applying piston at an advanced pressure position.

A disadvantage of prior art systems of this type is that time-consuming manipulation of the latching mechanism on the part of the operator or pilot is necessary for release of the braking mechanism. If the brakes are latched prematurely with the vehicle or aircraft still in motion, an emergency may arise requiring instantaneous release of the brakes. At such a time the delay required for latch manipulation may result in a serious accident.

The general object of the present invention is to provide an efficient and simple means for maintaining pressure in a brake system for parking and other purposes without requiring time-consuming manipulations to release the pressure. It is my object to employ manipulating means to latch the brakes and to provide for quick release of the latched brakes by a simple pedal movement.

Another object of my invention is to provide valve means for latching the brake system under pressure independently of the power chamber. By this arrangement leakage in the power chamber is eliminated as a factor in maintaining parking pressure, and it becomes possible during parking to completely retract the pressure-creating piston for fluid replenishment in the power chamber.

With specific reference to the valve means for latching the brake system under pressure independently of the power chamber, further objects of my invention include the following: to provide a simple and efficient valve suitable for manual closing by remote control; to provide a valve which in closed position is responsive either to fluid pressure in the power chamber or fluid pressure in the brake system proper, so that whether or not the valve remains closed depends upon the pressure in the power chamber relative to pressure in the brake system, which relative pressure is in turn controllable by the brake pedal; to provide a valve that either remains closed or else opens fully with a snap action; and to provide a fluid-pressure-responsive valve having pressure-differential surfaces to keep the valve from maintaining an intermediate position, the differential pressure exerted by the surrounding fluid serving to snap the valve open from any intermediate position.

The above and other objects and advantages of my invention will be apparent in the following description, taken with the accompanying drawing.

In the drawing, which is to be considered as illustrative only,

Fig. 1 is a diagrammatic view of a brake system embodying my invention;

Fig. 2 is a longitudinal section through a master cylinder in the system;

Fig. 3 is a fragmentary view similar to Fig. 2 showing certain elements in positions differing from Fig. 2; and Fig. 4 is a transverse section taken as indicated by the line 4—4 of Fig. 2.

Fig. 1 shows the principal parts of the illustrative system including: a master cylinder 10; a conduit 11 to a brake mechanism 12 for controlling a wheel 13; a brake pedal 15 operatively connected by a link 16 to a piston rod 17; a brake-latching mechanism generally designated 18; and a pull knob 20 that is mounted on a panel 21 and is connected to the brake-latching mechanism by a suitable cable 22 passing around pulleys 23.

The master cylinder 10 may be made in two sections with an intervening gasket 25, the two sections being held together by suitable screws 26. One end of the master cylinder may be provided with an ear or bracket 27 so that the master cylinder may be pivotally mounted by a bolt 28 on a fixed part 30 of the vehicle or aircraft. The opposite end of the master cylinder 10 into which the piston rod 17 extends may be provided with an end plate 31 held in place by suitable screws 32. The interior of the master cylinder is bored longitudinally to provide a reservoir chamber 33, a power chamber or cylinder 35, a passage 36 for receiving pressure from the power cylinder, and an accumulator 37 communicating with the passage 36. Fluid flows between the power cylinder 35 and the passage 36 through a port 38 and flows between the passage 36 and the conduit 11 through a threaded port 40.

Since the master cylinder 10 is shown in approximately horizontal position in Fig. 1, it is advisable to provide an auxiliary fluid reservoir in the form of a tank 41 that is connected by a supply pipe 42 to an inlet port 43 of the reservoir 33 or to an orifice of the plug 65 to be later described. However, if the normal position of the installed master cylinder 10 places the reservoir chamber 33 substantially higher than the power cylinder 35, the tank 41 and the supply pipe 42 may be omitted and the inlet port 43 closed with a suitable vented plug.

Slidingly mounted in the power cylinder 35 is a suitable piston 45 having a bore 46 that slidingly receives the piston rod 17. The piston 45 is provided with a suitable passage therethrough for fluid flow between the reservoir 33 and the power cylinder 35 and such a passage may be provided by simply making the bore 46 oversize relative to the piston rod. In the present construction the passage is provided by a small longitudinal bore 47 leading to a circular recess 48 on the outer face of the piston, the recess being suitably beveled at its rim to serve as a valve seat for a valve member 50 carried by the piston rod 17. The piston 45 has a restricted range of movement relative to the piston rod 17 as determined on one side by the valve member 50 and on the opposite side by a radial flange 51 on the piston rod 17. Preferably a helical spring 52 is in compression between the radial flange 51 and the piston 45 to urge the piston toward the valve member 50, but in the normal ineffective position of the piston 45 indicated in Fig. 2 the piston is held out of engagement with the valve member 50 by a suitable stop means. In the construction shown, the stop means is an annular shoulder 53 which is formed by making the inner diameter of the reservoir chamber 33 smaller than the inner diameter of the power cylinder 35. It will be apparent to those skilled in the art that this preferred arrangement of floating piston and valve is not essential to the invention covered by my claims. In fact, any kind of power chamber and any suitable means for creating pressure may be employed.

The piston rod 17 passes through an annular body 55 abutting the end plate 31 and is surrounded by a tubular member 56 formed with an annular shoulder 57. Abutting the inner face of the tubular member 56 is a packing ring 58 of U-shaped cross section into which seats an annular skirt 60 integral with the tubular member 56. Also surrounding the piston rod 17 is a suitable helical spring 61 that acts between the annular shoulder 57 of the tubular member 56 and the previously mentioned radial flange 51. It is apparent that the spring 61 has two functions, namely, the function of keeping the packing ring 58 in place and the function of continuously urging the piston rod 17 toward the reservoir 33. The spring 61 is preferably, but not necessarily, considerably stronger than the spring 52. The limit position to which the spring 61 tends to move the piston rod 17 may be determined by the radial flange 51 together with the spring 52, but in the preferred construction shown in the drawing I provide other means for limiting the spring-actuated movement of the piston. Thus, Fig. 2 shows an extended portion 62 of the piston rod 17 abutting the end wall 63 of the reservoir 33.

The accumulator chamber 37 which is closed by a suitable plug 65 contains a piston 66 carrying a packing ring 67 and houses a suitable helical spring 68 that continuously urges the piston toward the passage 36.

At one end of the passage 36 is a suitable plug 70 embraced by a packing ring 71 and held in place by the previously mentioned end plate 31. Intersecting the passage 36 is a lateral bore 72 leading to the power cylinder port 38, the purpose of the lateral bore being to house a suitable valve for cutting off communication between the power cylinder 35 and the passage 36 when it is desired to latch or lock the brakes hydraulically. As shown in Figs. 2 and 4, the lateral bore 72 contains a valve cage assembly comprising an annular valve seat member 73, a valve cylinder 75, a packing ring 76, and an annular body 77, this assembly being held in place by a retaining plate 78 that is anchored to the master cylinder by suitable screws 80. The valve seat member 73 provides the upper section of a passage, enlarged within the cylinder 75, opening on the port 38. This member 73 may be made of suitable fibrous material and may be embraced by a suitable packing ring 81. The valve cylinder 75 is bored radially to provide suitable ports 82 for communication with the accumulator chamber 37 and to provide other ports 83, these other ports 83 being in effect part of the passage 36. In fact, the whole interior of the valve cage is in effect part of the passage 36. The packing ring 76 is preferably U-shaped in cross section and serves to seal the end of the valve cylinder 75 as shown.

Mounted in the described valve cage assembly is a valve member generally designated 85 having a flanged head 86 and an axial stem 87, the stem extending through the cage assembly and the retaining plate 78 to the exterior of the master cylinder 10. Preferably, the valve member 85 is of highly polished metal to facilitate axial movement of the stem 87 through the packing ring 76 without significant leakage.

When the valve member 85 is seated as shown in Figs. 2 and 4, the face of the valve head 86 is in large part exposed to fluid pressure from the power cylinder 35, while the under side of the valve head provides an annular surface exposed in an opposing manner to pressure prevailing in the passage 36. It will be apparent that whether or not the valve member 85 remains in the closed position depends upon the relative pressures involved and the corresponding relative areas. The valve member will remain seated as long as pressure from the passage 36 predominates over pressure from the power cylinder 35, but will unseat the moment that pressure from the power cylinder predominates.

Once the valve member 85 is unseated and thereby moved to an intermediate position, the whole of the flanged head 86 is acted upon by the surrounding fluid, and it will be apparent that the extension of the valve stem 87 into the atmosphere results in a pressure differential to urge the valve member with a snap action to a maximum open position with the valve head abutting against a shoulder at the lower end of the enlarged passage provided by the valve cylinder 75. In other words, the valve provides differential areas for response to the surrounding pressure of the surrounding fluid, the face of the valve head being greater in area than the under side of the valve head. The surrounding pressure is usually relatively high and may approach 700 lbs. per sq. in. or higher.

The latching mechanism 18 has the function of mechanically restoring the valve member 85 to its seated position and may be of any suitable construction. In the arrangement shown, the bottom retaining plate 78 on the master cylinder provides a bracket 88 for a cross pin 90, and a suitable bell-crank 91 is pivotally mounted on the cross pin. One arm 92 of the bell-crank is a contact member movable against the end of the valve-stem 87 to force the valve member to seated position, and the other arm 93 of the bell-crank which comprises two parallel members is pivotally connected by a pin 95 to a suitable fitting 96 for connection with the previously mentioned cable 22. Preferably, yielding means is provided to hold the bell-crank 91, the cable 22, and the pull knob 20 in the normal positions shown in Fig. 1. Such a yielding means may comprise a suitable spring 97 anchored at one end to the previously mentioned fixed part 30 of the vehicle or aircraft, and attached to the other end to an ear 98 on the fitting 96.

The manner in which the described brake system functions may be readily understood. Normally, the valve member 85 is in maximum open position so that pressure in the passage 36 leading to the individual brake mechanisms corresponds to pressure in the power cylinder 35 and is determined by the extent to which leftward movement of the piston 45 causes the accumulator piston 66 to be displaced in opposition to the spring 68. Under such conditions of free flow between the power cylinder 35 and the passage 36, pressure in the brake system responds instantaneously to movements of the brake pedal 15. When the brake pedal 15 is in its normal released position, the piston 45 is pressed against the annular stop shoulder 53 by the small spring 52, and fluid may flow freely through the piston passage 47 between the reservoir 33 and the power chamber 35. At such time fluid may flow from the reservoir 33 into the power cylinder to compensate for leakage from the system or to compensate for thermal contraction of the fluid in the system. On the other hand, the flow may be from the power cylinder to the reservoir 33 to compensate for thermal expansion of the fluid in the system.

Whenever it is desirable to lock the brakes for parking while the piston 45 is in an advanced position with the accumulator piston 66 displaced against the pressure of the spring 68, the operator or pilot pulls on the knob 20 to move the valve member 85 to closed position, and, while the valve member is held seated, releases the brake pedal 15 to lower the pressure in the power cylinder 35. Lowering of the pressure in the power chamber causes the pressure in the passage 36 to predominate and hold the valve member 85 in seated position. When the brake pedal is released, the spring 61 causes the piston rod 17 to move toward the reservoir 33. Fig. 2 shows the positions of the various parts in brake-locking relationship and at the end of the spring-actuated movement of the piston rod 17 after the knob 20 has been pulled and released. It will be noted that the piston 45 is cut off from the pressure of the system and is spaced from the valve member 50 to permit flow through the piston.

Whenever the operation or pilot desires to unlatch the brakes, he merely presses quickly against the brake pedal 15 to cause an abrupt pressure rise in the power cylinder 35 to unseat the valve member 85, whereupon the valve member 85 snaps open to release pressure in the system, the brake pedal being released, of course, to permit the desired drop in pressure in the whole system.

When the piston rod 17 is moved out of the normal position shown in Fig. 2, the valve member 50 is brought into sealing relation with the piston 45 as indicated in Fig. 3, and such a sealing relation is maintained throughout the range of pressure positions of the piston. The spring 52 exerts sufficient pressure to prevent opening of the piston passage 47 regardless of any abrupt movements or rapid reciprocations of the piston rod 17.

The above description in specific detail of a preferred embodiment of my invention for the purpose of disclosure and to illustrate the principles involved will suggest to those skilled in the art various changes and substitutions based on my concept, and I reserve the right to all such departures from the description that lie within the scope of my appended claims.

I claim as my invention:

1. In a fluid-pressure system having an operating passage for transmitting operating pressure, the combination of: a power chamber having a port communicating with said operating passage for transmitting fluid pressure thereto; a valve member movable through the fluid in said passage between a retracted position and a seated position cutting off said port, said valve member having a portion extending into the atmosphere thereby providing differential surfaces whereby differential force from the surrounding fluid in the system tends to retract the valve member, said differential surfaces being divided at the seated position of the valve member into an area exposed to pressure from said passage in a direction to tend to hold the valve member seated and an area exposed to pressure from said power chamber to tend to unseat the valve member, whereby whether or not the valve member remains seated depends upon the relative magnitudes of the opposite forces; and means to seat said valve member in opposition to said differential force from fluid in said passage, whereby said valve member may be seated, pressure in the power chamber lowered to keep the valve member seated, and then pressure raised in the power chamber to cause the valve member to be unseated and retracted.

2. In a fluid-pressure system a combination as set forth in claim 1 in which the means to seat said valve in opposition to said differential force is a mechanical means to act against the exterior portion of said valve member.

3. In a fluid-pressure system having an operating passage for transmitting operating pressure, the combination of: a power chamber having a port communicating with said operating passage for transmitting fluid pressure thereto; a first control means to contract the effective volume of said power chamber, thereby to create fluid pressure in said operating chamber; a valve member movable through the fluid in said passage between a retracted position and a seated position cutting off said port, said valve member having a portion extending into the atmosphere thereby providing differential surfaces whereby differential force from the surrounding fluid in the system tends to retract the valve member, said differential surfaces being divided at the seated position of the valve member into an area exposed to pressure from said passage in a direction to tend to hold the valve member seated and an area exposed to pressure from said power chamber to tend to unseat the valve member, whereby whether or not the valve member remains seated depends upon the relative magnitudes of the opposite forces; and a second control means to close said valve in opposition to the pressure of surrounding fluid on said differential areas, said valve being adapted to remain closed in response to pressure in said passage until more effective pressure is created in said power chamber.

4. In a fluid-pressure system having an operating passage for transmitting operating pressure, the combination of: a power chamber having a port communicating with said operating passage for transmitting fluid pressure thereto; a valve member having a valve head in said passage and a stem extending from the passage into the atmosphere, said valve member being movable between a retracted position with maximum extension in the atmosphere and a position in which the valve head is seated to cut off said port, said valve head providing differential surfaces, whereby differential force from the surrounding fluid in said passage tends to retract the valve member, said differential surfaces being divided at the seated position of the valve head into an area exposed to pressure from said passage in a direction to tend to hold the valve member seated and an area exposed to pressure from said power chamber to tend to unseat the valve member, whereby whether or not the valve member remains seated depends upon the relative magnitudes of the opposite forces; and means to seat said valve member in opposition to said differential force from fluid in said passage, whereby said valve member may be seated, pressure in the power chamber lowered to keep the valve member seated, and then pressure raised in the power chamber to cause the valve member to be unseated and retracted.

5. In a fluid-pressure system a combination as set forth in claim 4 in which said valve member is in a valve cage having a longitudinal passage to said power chamber and having a lateral passage constituting part of said operating passage.

6. In a fluid-pressure system having an operating passage for transmitting operating pressure, the combination of: a power chamber having a port communicating with said operating passage for transmitting fluid pressure thereto; a valve member movable through the fluid in said passage between a retracted position and a seated position cutting off said port, said valve member having a portion extending into the atmosphere thereby providing differential surfaces whereby differential force from the surrounding fluid in the system tends to retract the valve member, said differential surfaces being divided at the seated position of the valve member into an area exposed to pressure from said passage in a direction to tend to hold the valve member seated and an area exposed to pressure from said power chamber to tend to unseat the valve member, whereby whether or not the valve member remains seated depends upon the relative magnitudes of the opposite forces; an accumulator communicating with said passage to maintain pressure to tend to hold said valve member seated; and means to seat said valve member in opposition to said differential force from fluid in said passage, whereby said valve member may be seated, pressure in the power chamber lowered to keep the valve member seated, and then pressure raised in the power chamber to cause the valve member to be unseated and retracted.

7. In a fluid-pressure system confining a fluid body and having a variable-volume power chamber to place said fluid body under pressure, the combination therewith of: a valve to cut off said fluid body from said power chamber, said valve in closed position having a responsive surface exposed to pressure from said fluid body to tend to hold the valve closed and a responsive surface exposed to pressure from said power chamber to tend to open the valve and a portion exposed to the atmosphere, thereby providing differential surfaces whereby pressure of the surrounding fluid in the system tends to retract said valve; and manually operable means contacting said valve portion exposed to the atmosphere and adapted for positively actuating said valve to closed position.

8. In a device of the character described, the combination of: a housing having a main bore and an auxiliary bore, an outlet communicating with said auxiliary bore, and a radial port communicating between said bores and opening through one wall of said housing; valve means adapted to be inserted into said housing through said radial port from the exterior of the housing to an operating position in which it is adapted to permit a flow of fluid through said port from said main bore to said auxiliary bore but adapted to prevent a reverse flow of fluid; means for closing the portion of said port which passes through said housing wall to prevent leakage of fluid therethrough; axially movable piston means in said main bore and adapted to be moved therein toward said radial port to cause a flow of fluid from said main bore through said port and said valve means and said auxiliary bore to said outlet, said piston being so movable from a released position to a pressure-applying position; a fluid supply means communicating with the end of said main bore on the side of said piston away from said radial port; means providing fluid communication between said fluid supply means and said main bore when said piston is in said released position; and actuating means operatively connected to said piston for so moving it axially.

9. In a device of the character described, the combination of: a housing having a main bore and an auxiliary bore, an outlet communicating with one end of said auxiliary bore, and a fluid passage communicating between said outlet and said bores; a piston in said main bore and axially movable therein to force fluid from one end of said main bore through said passage to said outlet; means for so moving said piston; a valve seat disposed in the line of said passage and located therein between said bores; valve means adapted to seat in closed position on said valve seat to close said passage so as to prevent a fluid flow from said outlet to said main bore therethrough but permitting a reverse flow of fluid; spring controlled means for moving said valve means from open to said closed position; spring means connected for biasing said spring controlled means toward a non-valve-actuating position; a plunger in said auxiliary bore; means for axially moving said plunger to force fluid from one end of said auxiliary bore through said passage to said outlet; and a cap member removably secured to said housing and providing fluid communication between the other ends of said bores, said plunger and said spring means being insertable into said auxiliary bore through said other end thereof when said cap member is removed from said housing.

10. In a device of the character described, the combination of: a housing having a passage therein, and having an inlet port and a discharge port communicating with said passage; a valve seat in said passage; a poppet valve in said passage and adapted to seat upon said valve seat to close fluid communication between said ports, said valve having a stem extending through one wall of said passage and having an end thereof at all times exposed to relatively low fluid pressure; means for causing said valve to seat on said valve seat to close the same; a cylinder having fluid communication at one end with said passage, said cylinder having port means permanently open and by-passing said valve and directly communicating with said passage and said discharge port; an axially movable piston in said cylinder; and spring means tending to urge said piston toward said end of said cylinder.

JOHN N. GLADDEN.

REFERENCES CITED

The following references are of record in the file of this patent:

UNITED STATES PATENTS

| Number | Name | Date |
|---|---|---|
| 866,440 | Denief | Sept. 17, 1907 |
| 1,117,723 | Swyney | Nov. 17, 1914 |
| 2,205,759 | Davis | June 25, 1940 |
| 2,230,806 | Lohmolder | Feb. 4, 1941 |
| 2,231,294 | Queen | Feb. 11, 1941 |
| 2,258,798 | Patrick | Oct. 14, 1941 |
| 2,289,563 | Wood | July 14, 1942 |
| 2,301,037 | Greene | Nov. 3, 1942 |
| 2,322,062 | Schnell | June 15, 1943 |
| 2,343,809 | Schnell | Mar. 7, 1944 |